(12) United States Patent
Dethlefsen et al.

(10) Patent No.: US 12,161,094 B2
(45) Date of Patent: Dec. 10, 2024

(54) AQUACULTURE SYSTEM WITH IMPROVED FEED TRANSPORTATION AND METHOD FOR TRANSPORTING FEED IN AN AQUACULTURE SYSTEM

(71) Applicant: GRAINTEC A/S, Vejle (DK)

(72) Inventors: Markus Wied Dethlefsen, Vejle (DK); Klaus Damsboe Holgersen, Vejle (DK); Benny Simonsen, Egtved (DK)

(73) Assignee: GRAINTEC A/S, Vejle (DK)

( * ) Notice: Subject to any disclaimer, the term of this patent is extended or adjusted under 35 U.S.C. 154(b) by 497 days.

(21) Appl. No.: 17/421,813

(22) PCT Filed: Jan. 10, 2020

(86) PCT No.: PCT/DK2020/050007
§ 371 (c)(1),
(2) Date: Jul. 9, 2021

(87) PCT Pub. No.: WO2020/143890
PCT Pub. Date: Jul. 16, 2020

(65) Prior Publication Data
US 2022/0095594 A1    Mar. 31, 2022

(30) Foreign Application Priority Data
Jan. 11, 2019 (DK) .......................... PA 2019 70019

(51) Int. Cl.
*A01K 63/04*   (2006.01)
*A01K 61/85*   (2017.01)
*A01K 63/06*   (2006.01)

(52) U.S. Cl.
CPC ............ *A01K 63/045* (2013.01); *A01K 61/85* (2017.01); *A01K 63/042* (2013.01); *A01K 63/065* (2013.01)

(58) Field of Classification Search
CPC .. A01K 63/045; A01K 63/042; A01K 63/065; A01K 61/85
(Continued)

(56) References Cited

U.S. PATENT DOCUMENTS 3,347,211 A * 10/1967 Falkenberg .......... A01K 63/045
119/261
3,533,917 A * 10/1970 Williams ............... B01D 3/065
202/205

(Continued)

FOREIGN PATENT DOCUMENTS

CN    101940188 A    1/2011
CN    102334459 A    2/2012
(Continued)

OTHER PUBLICATIONS

Expert's Reply on Patent Application issued in corresponding Chilean Application No. 2021-1837, Ref. 80-1506 (002), pp. 1-12.
(Continued)

*Primary Examiner* — Timothy D Collins
*Assistant Examiner* — Maria E Graber
(74) *Attorney, Agent, or Firm* — Robinson & Cole LLP

(57) ABSTRACT

An aquaculture system including a fish holding unit which is fluidly connected to a water recirculation conduit, a water treatment unit, a water inlet, and a feed storage unit. The system further includes a feed loading section. When feed is added into the system at the feed loading section the feed is transported to the fish holding unit. In another aspect the invention relates to a method of transporting a feed in a recirculated aquaculture system.

27 Claims, 7 Drawing Sheets

(58) Field of Classification Search
USPC .......................................................... 119/226
See application file for complete search history.

(56) References Cited

U.S. PATENT DOCUMENTS

| | | | | |
|---|---|---|---|---|
| 3,916,832 A * | 11/1975 | Sweeney | ................ | A01K 61/10 |
| | | | | 119/212 |
| 4,221,187 A * | 9/1980 | Casey | .................... | A01K 63/10 |
| | | | | 119/232 |
| 4,279,218 A | 7/1981 | Brinkworth | | |
| 4,894,151 A * | 1/1990 | Woltmann | ........... | A01K 63/045 |
| | | | | 210/282 |
| 5,014,647 A * | 5/1991 | Woltman | ............... | A01K 63/04 |
| | | | | 119/3 |
| 5,076,209 A * | 12/1991 | Kobayashi | ........... | A01K 63/042 |
| | | | | 119/217 |
| 5,593,574 A * | 1/1997 | VanToever | .......... | A01K 63/045 |
| | | | | 210/150 |
| 5,961,831 A * | 10/1999 | Lee | ...................... | A01K 63/042 |
| | | | | 119/260 |
| 6,447,681 B1 * | 9/2002 | Carlberg | ................. | C02F 3/327 |
| | | | | 210/219 |
| 7,624,703 B2 * | 12/2009 | Vago | ......................... | C02F 1/36 |
| | | | | 119/201 |
| 8,516,976 B2 * | 8/2013 | Kim | ...................... | A01K 63/065 |
| | | | | 119/225 |
| 10,034,461 B2 * | 7/2018 | Holm | ....................... | C02F 3/305 |
| 10,163,199 B2 | 12/2018 | Gilmore et al. | | |
| 10,694,722 B1 * | 6/2020 | Holm | .................... | A01K 63/045 |
| 11,234,681 B2 * | 2/2022 | Jay-Russell | ............ | A01G 31/02 |
| 2003/0213745 A1 * | 11/2003 | Haerther | ................... | C02F 3/32 |
| | | | | 210/602 |
| 2005/0109697 A1 * | 5/2005 | Olivier | ...................... | C02F 3/34 |
| | | | | 210/615 |
| 2006/0191411 A1 * | 8/2006 | Johnson | ............... | B01D 53/263 |
| | | | | 95/187 |
| 2008/0314811 A1 * | 12/2008 | Smith | ..................... | A01K 63/04 |
| | | | | 119/259 |
| 2009/0152192 A1 * | 6/2009 | Michaels | ................ | C02F 3/302 |
| | | | | 210/605 |
| 2010/0236137 A1 * | 9/2010 | Wu | ......................... | C11C 3/003 |
| | | | | 554/8 |
| 2011/0039321 A1 * | 2/2011 | Tal | ......................... | C02F 11/04 |
| | | | | 119/260 |
| 2013/0247832 A1 * | 9/2013 | Holder | ..................... | C02F 3/104 |
| | | | | 210/150 |
| 2016/0200601 A1 * | 7/2016 | Clark | ...................... | A01K 61/85 |
| | | | | 210/96.1 |
| 2017/0013810 A1 * | 1/2017 | Grabell | .................. | A01K 61/80 |
| 2017/0150701 A1 | 6/2017 | Gilmore et al. | | |
| 2018/0125041 A1 * | 5/2018 | Holm | .................... | A01K 63/045 |
| 2023/0140295 A1 * | 5/2023 | Cho | ........................ | A01K 63/00 |
| | | | | 119/226 |

FOREIGN PATENT DOCUMENTS

| | | |
|---|---|---|
| CN | 205213864 U | 5/2016 |
| CN | 205922500 U | 2/2017 |
| CN | 108522393 A | 9/2018 |
| GB | 2147181 A | 5/1985 |
| JP | S54130392 A | 10/1979 |
| JP | H0576257 A | 3/1993 |
| JP | 2018108075 A | 7/2018 |
| NO | 149372 B | 1/1984 |
| NO | 318416 B1 | 3/2005 |
| WO | 0228199 A2 | 4/2002 |
| WO | 2002056676 A1 | 7/2002 |
| WO | 2011064538 A1 | 6/2011 |
| WO | 2011161449 A | 12/2011 |
| WO | 2015067955 A1 | 5/2015 |
| WO | 2016160141 A1 | 10/2016 |
| WO | 2018212666 A1 | 11/2018 |

OTHER PUBLICATIONS

International Search Report issued in corresponding PCT Application No. PCT/DK2020/05007, date mailed Mar. 16, 2020, pp. 1-3.
CN Office Action issued in corresponding CN Application No. 202080008492.2, dated Jun. 6, 2023, pp. 1-10.
Notice of Reasons for Refusal issued in corresponding JP Application No. 2021-539945, dated Sep. 19, 2023, pp. 1-4.
Communication of Notice of Opposition issued in corresponding EP Application No. 207000861.6, dated Apr. 15, 2024, pp. 1-32.

* cited by examiner

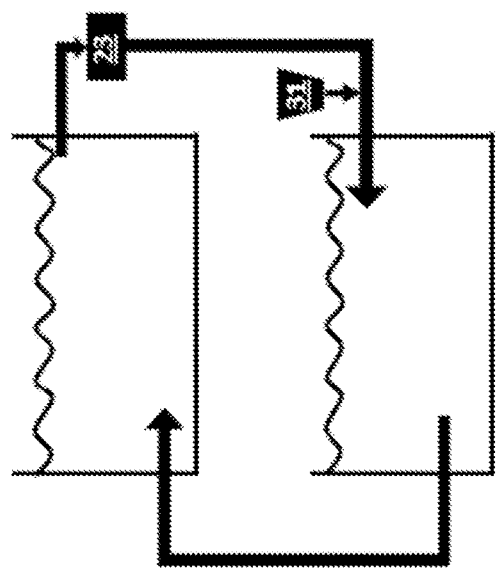
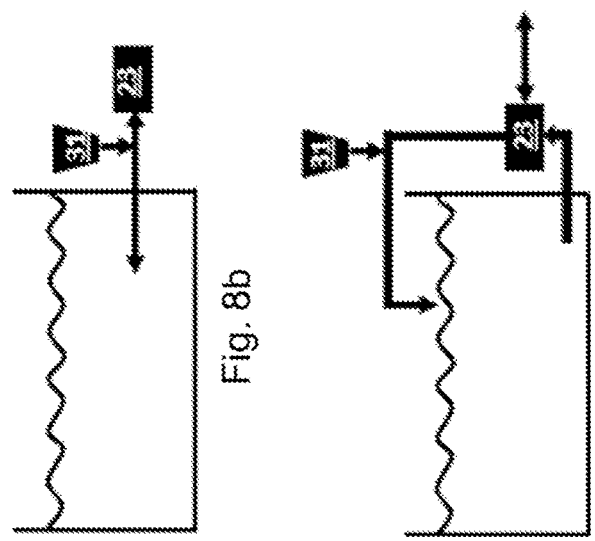
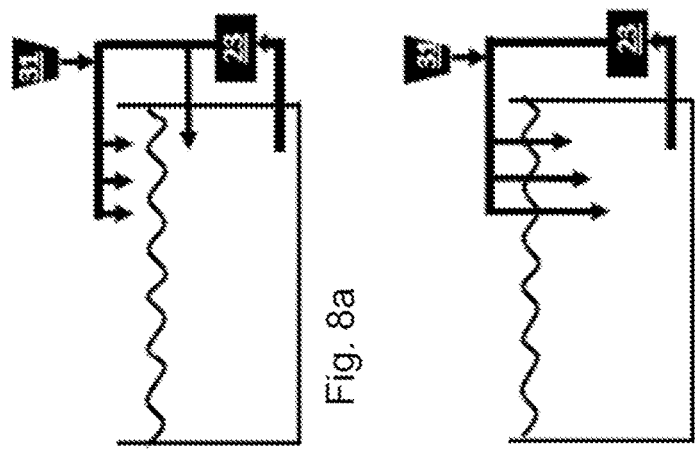

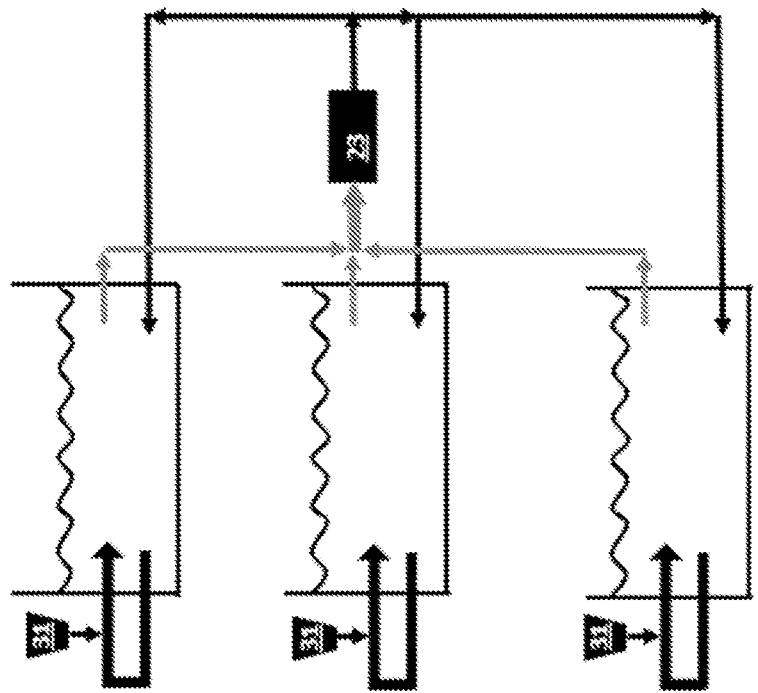
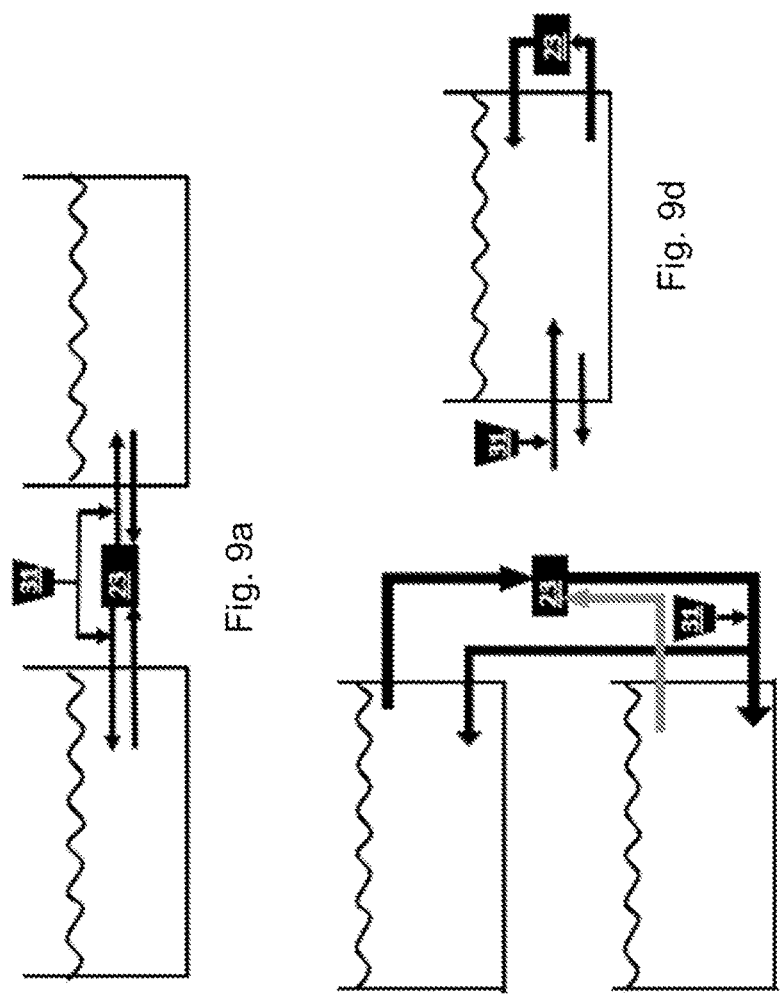

AQUACULTURE SYSTEM WITH IMPROVED FEED TRANSPORTATION AND METHOD FOR TRANSPORTING FEED IN AN AQUACULTURE SYSTEM

CROSS-REFERENCE TO RELATED APPLICATIONS

The instant application is a U.S. National Stage application of and claims priority to PCT/DK2020/050007, filed on Jan. 10, 2020, which is a PCT application of and claims priority to DK Application No. PA 2019 70019, filed on Jan. 11, 2019, the subject matter of both aforementioned applications are hereby incorporated by reference in their entireties.

FIELD

The present invention relates to a system and a method for transporting feed, more specifically to transporting feed in a recirculated aquaculture system (RAS).

BACKGROUND

Farmed fish and shellfish are dependent on receiving all required nutrients in the feed delivered to their aquaculture site, e.g. cages out in the sea, flow-throughs in connection to a river or pond, or on-land sites such as RAS facilities. In most apparatus used for today's transportation of fish feed to the feeding site, pneumatic or mechanical principles are prevalent. Typically, in case of pneumatic conveying, the feed pellets are blown by means of either fans or air compressors. It is well-known that pneumatic transport of feed pellets easily can cause pellet degradation and generate dust and fines up to 7%, as described in WO2015067955. Also, the pipe used for transporting the feed is worn due to friction between pipe wall and pellets.

Steel pipes are heavy, require additional support and are expensive, whereas plastic pipes are cheap, but need more maintenance and release micro-plastic to the feed and the aquaculture site. The generation of fines and dust from the feed pellets has a considerable cost and must be minimized as much as possible. It corresponds to lost feed and essential/limiting nutrients, and it pollutes the surrounding environment. In case of RAS facilities, it additionally stresses the mechanical and/or (micro)biological filters used for cleaning the water in the aquaculture system.

An alternative way of transporting fish feed is by hydraulic transport which is known from WO2002056676, which relates to a system utilizing hydraulic feeding to deliver the feed below the water surface, especially relevant for demersal fish species such as catfish, turbot, and halibut. Hydraulic transport is also known from WO2011064538 and WO2015067955, which describe how hydraulic transport of aquaculture feed is used for impregnating the dry fish feed pellets with water to improve their digestibility. Impregnating the feed will constitute a mass transport, not only of water into the feed, but also nutrients and oils from the feed leaking out in the water.

WO2016160141 discloses a modularised shrimp production system. The system comprises a production sub-unit module, a RAS module, a feed distribution module, and a computer control module. The system is modularised and integrated to form a multi-phasic synchronous super-intensive shrimp production system controlled by a custom designed cyber-physical platform. The system is considered to provide aquaculture of shrimps using a total water volume per weight of shrimp produced significantly less than with conventional techniques.

A loss of nutrients is not desired since more feed then is required to provide the necessary nutrients to the fish, and thus is an additional cost.

A leak of oils from the feed is not optimal but can be tolerated when the fish are bred in open water. However, in e.g. RAS facilities the oil will settle in the filters and reduce their efficiency. This may result in an increased amount of $CO_2$ in the cleaned water, which have the effect that the fish grow slower.

Therefore, it is desired to develop a more gentle and efficient way of transporting feed, especially in RAS facilities.

SUMMARY

It is an object of the invention to provide an aquaculture system with an improved and gentle transportation of feed. Thus, according to a first aspect of the invention this and other objects are achieved by an aquaculture system, the system comprising: a fish holding unit fluidly connected to a water recirculation conduit, a water treatment unit, a water inlet, and a feed storage unit, the system further comprising a feed loading section located upstream of the water inlet or in the water recirculation conduit, so that when feed is added into the system at the loading section it is hydraulically transported to the fish holding unit, wherein the water recirculation conduit comprises the water treatment unit and wherein the feed loading section is located downstream of the water treatment unit.

The fish holding unit, the water recirculation conduit, the water treatment unit, the water inlet, and the feed storage unit may be serially connected, or the fish holding unit, the water recirculation conduit, the water treatment unit, the water inlet, and the feed storage unit may be connected in parallel. Likewise, the fish holding unit, the water recirculation conduit, the water treatment unit, the water inlet, and the feed storage unit may be connected in a combination of serial and parallel connection. Thus, for example the water recirculation conduit may comprise the water treatment unit and the feed storage unit in serial connection, with the water inlet connected to the fish holding unit.

The hydraulic feed transport has been shown to obtain a gentler feed transportation and to reduce the amount of generated dust and fines. The system has also been shown to successfully reduce the feed losses and required energy for transportation. In addition, the installation costs may be significantly lowered as plastic pipes can be used without the risk of micro-plastic generation. An installation of plastic pipes also requires much less support than e.g. steel pipes. In addition, if steel pipes are used, they are typically of expensive high-grade stainless steel to avoid corrosion, especially in RAS facilities designed for salt water species, such as grow-out salmon. Also, hydraulic transportation adds flexibility to the installation as elbows in the present hydraulic system are damaging the feed significantly less compared to conventional pneumatic transport systems.

In a preferred embodiment the feed loading section is located in a conduit made of a plastic material. Preferably the conduits of the recirculation conduit are also made of a plastic material. Plastic such as but not limited to PE, such as High density PE, nylon, PVC, POM may be used.

These advantages may apply to aquaculture system facilities with fully or partially internally recirculated water. An aquaculture system with recirculated water may, in the context of the invention, be referred to as a "recirculated aquaculture system" (RAS). Thus, in an embodiment the aquaculture system of the invention is a RAS. It is also apparent to the skilled person that these advantages will also apply to different kinds of fish farming which has water transporting pipelines which can be used to transport the feed.

The term hydraulic transport is used to describe solid-liquid flow. In this context the solid-liquid flow is comprised of fish feed, e.g. granules or pellets, and water.

The preferred type of feed for this system is in the form of granules or pellets but other types of fish feed such as agglomerates, moist or semi-moist feed or even chops of fish may also be used.

The fish holding unit may have any shape as desired suitable of containing a liquid. It may e.g. be a cylindrically shaped unit, or a cuboid shaped unit. It may be a tank, vessel, aquarium, basin, or the like made from any material. It could also be a pond or basin in which some filtration and/or cleaning is used. The upper side of the fish holding unit may be open, or it may have a removable or fixed lid. When the system is used as desired, i.e. for breeding fish, there is water in the aquaculture system. Most of the water is typically comprised in the fish holding unit which is where the fish are bred. The type of water in the system is adapted to the species of fish which are farmed. For saltwater fish the water is adapted to resemble seawater, whereas for freshwater fish, the water is adapted to resemble freshwater. The quality and properties of the water may also be controlled, hereunder purity, $O_2$ content, and temperature.

The recirculation conduit is a series of water conduits or water pipes suitable for transporting the water to/from the fish holding unit. The recirculation conduit is fluidly connected to the fish holding unit and forms a water circuit. The recirculation conduit is connected to the fish holding unit through at least one aperture allowing for an intake or outlet of water. Preferably the water pipes in the recirculation conduit are used to remove water continuously or intermittently from the fish holding unit. The recirculation conduit may comprise one or more unit operations which the water passes through, where after the water is returned to the fish holding unit, i.e. the recirculation conduit recirculates the water. In this context a unit operation may be, but is not limited to, treatment of the water, addition of solids e.g. feed, fluid transportation means such as pumps etc. The point in which the water enters the recirculation conduit from the fish holding unit through an aperture can be seen as a start site for the recirculation of the water. The water will flow from this start site through the conduits and at some point return to the fish holding unit. The point where the water returns to the fish holding unit through an aperture can be seen as an end site. It is to be understood that the start site and the end site are included in the loop provided by the recirculation conduit so that water may flow from the end site to the start site. The water will have a certain residence time in the fish holding unit where after it again will enter the recirculation conduit at the start site. The residence time may be defined from any site in the recirculation conduit to any other site in the recirculation conduit.

When the terms upstream and downstream are used to describe the location of the e.g. unit operations in the recirculation conduit, it is with respect to this start site unless noted otherwise.

The recirculation conduit can be coupled to a single fish holding unit, or it may be used to couple several fish holding units together. In such case, the fish holding units may be coupled in series or in parallel. When several fish holding units are connected by the recirculation conduit, the water from the fish holding units may be combined and treated in the same water treatment unit. Similarly, feed may be added to a single stream of water at the feed loading section and may then be distributed to a plurality of individual fish holding units. As mentioned, one kind of unit operations comprised in the recirculation conduit may be a water treatment unit. The water treatment unit may comprise a series of treatment processes to maintain water quality such as, but not limited to, bio-filtration, removing of solids, e.g. filtration, oxygenation, pH control, temperature control, $CO_2$ stripping, optionally including heating and/or cooling, Ultra Violet (UV) treatment and/or ozone treatment.

The recirculation conduit is not limited to recirculation of water in a single fish holding unit. It may also flow water from a first fish holding unit to a second fish holding unit, preferably with a water treatment unit in between the fish holding units. In this configuration the fish holding units would be coupled in series, such that the recirculation conduit or another recirculation conduit would return the water from the second fish holding unit to the first fish holding unit.

The water inlet may refer to a water inlet which supplies water to the aquaculture system. Typically, freshly supplied water is provided through the water inlet to the aquaculture system. The water inlet to the aquaculture system may be located anywhere in the aquaculture system, such as in the recirculation conduit or directly in the fish holding unit. When it is an inlet for adding freshly supplied water to the aquaculture system, the inlet is preferably located upstream of the water treatment unit or in the water treatment unit, such that the water quality of the inlet water is adapted for the system. The aquaculture system may also comprise a water outlet. The water outlet may be located anywhere in the aquaculture system, such as in the recirculation conduit or in the fish holding unit, or water outlets may be contained both in the fish holding unit and in the recirculation conduit. The water outlet allows for a flow of water out of the system. The aquaculture system may also have a combined conduit for the inlet and outlet of water. Typically, the inlet of freshly supplied water in a RAS facility is small since it is expensive to replace the amount of water in the facility.

The feed storage unit is used for containment of the fish feed. The feed storage unit may be any shape or size suitable for containing feed in a RAS facility. Typically, the feed storage unit is a tank or silo. In the case that the feed is produced on-site at the RAS facility, the feed storage unit may be a container portion of an on-site feed production unit. Such container portion may function to at least hold freshly produced feed. The feed storage unit is preferably located adjacent to the feed loading section. The feed loading section is the portion of a conduit which allows for feed to be added into the conduit while water is flowing inside it. Feed may also be hydraulically transported from a feed storage unit to several fish holding units.

The loading of feed from the feed storage unit into the water at the feed loading section can be achieved using feed loading means, e.g. mechanical means such as a feed screw of conveyer or by suction means. Suction means include e.g. a venturi injector from which an under pressure is obtained which creates a flow of feed into the water.

Alternatively, the feed may also be sucked into the feed loading section by means of an under pressure obtained by a pump.

The feed loading section is the location in a conduit where feed is added into a flow of water. The feed is then hydraulically transported with the flow to a desired location.

The feed loading section may be located upstream of and fluidly connected to the water inlet, such that when freshly supplied water is added to the aquaculture system, feed is hydraulically transported with the freshly supplied water into the fish holding unit. In RAS facilities it is desired to minimize the inlet flow of freshly supplied water since this is an additional cost. Typically, 99.5% of the water in a RAS facility is recirculated. The addition of freshly supplied water is only around 0.5% of the total volume of water. Depending on the amount of fish in the aquaculture system, this flow of water may not be large enough to hydraulically transport a sufficient amount of feed. In a preferred embodiment the feed loading section is therefore located in the water recirculation conduit. By recirculating water from the fish holding unit, the desired volumetric flow can be obtained for hydraulic transport of feed without additional supply of freshly supplied water. Having control of the desired volumetric flow generally affords that all parameters associated with the water flow may be adapted in a way suitable for the hydraulic transport of feed. For instance, the flow may be regulated such that it is gentle, resulting in fewer fines and/or less liquid loss (such as oil loss). Another example could be that the flow may be controlled to achieve a greater distribution of the feed. The greater volumetric flow achieved by recirculation allows for the use of conduits with a larger cross-sectional area at water velocities suitable for the hydraulic transport of feed. When the feed is hydraulically transported via conduits with a larger cross-sectional area, the feed is effectively distributed throughout a larger area/volume when it leaves the conduit and reaches the desired location. Hence, a water flow through a conduit with a larger cross-sectional area at water velocities suitable for hydraulic transport of feed results in a greater distribution of the feed relative to a water flow through a conduit with a smaller cross-sectional area at the same water velocity, suitable for hydraulic transport of feed. Besides allowing a greater distributional area, the greater volumetric flow achieved by recirculation also allows a greater velocity of the water in the recirculating conduit, even when a conduit with a larger cross-sectional area is used. A water flow through a conduit with a cross-sectional area at a greater velocity results in a greater distribution of the feed relative to a conduit with the same cross-sectional area and a lower velocity, when the water comprising the feed leaves the conduit. Having a greater distribution of feed is advantageous, as the feed is more evenly distributed among the fish, resulting in a stock of fish with a lower average size deviation. This is valuable in the industry, as fewer fish will be of smaller and less valuable sizes. Further, it will require less time to grow the fish to the minimum size required for harvest.

In aquaculture systems with a minimized flow of freshly supplied inlet water, it is preferred to treat the water to maintain a good water quality. A fish holding unit may comprise between 200 m³ to 50,000 m³ of water. Typically, industrial aquaculture systems comprise several fish holding units. The fish holdings unit may be smaller fish holding units of up to 5,000 m³, medium sized fish holding units of up to 15,000 m³ or larger fish holding units of e.g. 50,000 m³, such as 25,000 to 35,000 m³, or combinations thereof. The recirculation and treatment of water in the fish holding units are highly dependent on the fish density in the fish holding units, but also the quality of feed. Fish density is the number of fish per volume of water in the fish holding units. The water is recirculated and treated to maintain a good water quality for the fish. If the fish density is low the recirculation of water may be low, e.g. 0.5 to 5 times per hour, whereas if the fish density is high the water in the fish holding units is recirculated up to 20 times per hour. Similarly, the water may be recycled less if the quality of the feed is high and less oils and disintegrated pellet particles are present in the water. A recirculated flow of water between 400 m³/hour to 100,000 m³/hour per tank can therefore be expected. This recirculated flow of water is sufficiently high for transporting feed. Additionally, since current RAS facilities already have such a conduit, the feed loading section may be retrofitted to the conduit to provide an aquaculture system with hydraulic transport of feed.

In a preferred embodiment the water recirculation conduit comprises the water treatment unit located downstream of the start site and upstream of the end site and further comprises a feed loading section which is located downstream of the water treatment unit but upstream of the end site. This setup ensures that feed is added to the water after the water treatment unit, so that the different treatments do not damage the feed. A sufficient treatment of the water also allows for exchange of the treated water between different fish holding units without increasing the risk of infection between the fish holding units. Water from one fish holding unit can therefore be used to hydraulically transport feed to another fish holding unit.

In a preferred embodiment the recirculation conduit, from the feed loading section to the feeding point, has conduits of a substantially constant diameter and has a minimum of difference in elevation. In this way rapid changes in pressure are avoided.

Typically, the diameter of the pipes from the feed loading section to the feeding point is 25 mm to 130 mm, such as 30 mm to 100 mm, such as preferably 50 mm to 60 mm. Typically a pipe diameter of 50 mm to 60 mm is sufficient when feed is hydraulically transported to a single fish holding unit, whereas a pipe diameter of 100 mm or more may be required for hydraulically transporting feed to a plurality of fish holding units.

The difference in elevation between the feed loading section and the feeding point is preferably at or smaller than 5 meters, more preferably at or smaller than 3 meters, such as in the range of 0 to 3 meters. The length of the conduits from the feed loading section to the feeding point may differ due the design of the aquaculture system. Preferably the distance is rather small, such as in the range of 10 to 50 meters, but it may be larger than 100 meters. A constant pressure drop during the conduit can be expected, but by avoiding sudden pressure drops, due to differences in elevations or change in pipe diameter it is less likely to have a mass transport of oil and nutrients from the pellet into the water caused by water impregnation of the pellet. The total pressure drop is typically 1 bar to 5 bar, but may be up to 7 bar.

The feeding point is the place where the feed becomes available to the fish in the fish holding unit. This feeding point is therefore in the fish holding unit near the aperture of the end site. Typically, the largest pressure drop for a pellet is at the feeding point. The pressure in the fish holding units is around 1 bar whereas the pressure in the recirculation conduit is larger/lower due to the circulation of water. When the pellet enters the fish holding unit at the feeding point from the recirculation conduit, the pellet may experience a pressure drop of up to 7 bar. Typically, this pressure drop is lower, such as 2 to 3 bar.

The inventors have found that since the pressure drop occurs when the pellet enters stagnant water, the pellet is less likely to become impregnated with water and release oils and nutrients to the water. A low and steady pressure drop in the conduits is therefore important. In a preferred embodiment the change of pressure in the recirculation conduit, which occurs from the feed loading section to the end site, is up to 7 bar, such as up to 5 bar, preferably 3 bar or lower, such as 1 bar or lower, such as 0.5 bar or lower, preferably lower than 0.1 bar.

The low change of pressure has the benefit that the pellets are not impregnated with water. The mass transport of nutrients and oil out of the pellet is therefore reduced. Consequently, water treatment units of existing RAS facilities are therefore sufficient to treat the water since the amounts of oils and/or nutrients in the water when using a hydraulic transport of feed according to the invention, are similar to when the feed is pneumatically or mechanically transported.

Fish feed, such as pellets, are often comprised of dry matter with a very low content of water. Typically, a dry pellet comprises between 5 w/w % and 10 w/w % of water. When the pellets are added into water, the water will start to penetrate the pellet surface and be absorbed in the pellet dry matter or sucked into the porous structure of the pellet. The absorption of water into the pellet is called water impregnation. It is desired that the degree of water impregnation is as low as possible during the hydraulic transport of pellets. A water impregnated pellet is softer than a dry or partially impregnated pellet. As the pellet absorbs the water the outer layers start to disintegrate.

Preferably the flow in the recirculated aquaculture system from the feed loading section to the feeding point, has a Reynolds number below 500,000, preferably below 200,000, more preferably below 100,000, more preferably below 50,000, most preferably below 20,000 such as 20,000 to 5,000.

In a preferred embodiment the residence time from the feed loading section to the feeding point is at or less than 3 min, preferably less than 1 min, more preferably less than 30 seconds, most preferably less than 15 seconds, most preferably around 5 seconds. The residence time from the feed loading section to the feeding point may also be referred to as the feed residence time. When the feed is added to the recirculation conduit at the feed loading section, it is transported from the feed loading section with the water flow through the conduit to the fish holding tank. The residence time is the time from when the pellet is added into the water at the feed loading section, until the feed enters a fish holding unit at the feeding point. The low residence time, e.g. in the range of 5 seconds to 2 minutes, of the feed in the water ensures that the pellet is not impregnated since only a limited amount of water is absorbed into the surface of the pellet. These embodiments ensure that the leakage of nutrients and/or oils is reduced since it has been found that the leakage increases with increasing residence time, and/or Reynolds number of the flow.

In another aspect the invention relates to a method of transporting a feed in a recirculated aquaculture system, the method comprises providing a flow of water from a feed loading section to a feeding point of the recirculated aquaculture system, adding the feed to the flow of water at the feed loading section to provide a flow of feed containing water; and hydraulically transporting the feed containing water to the feeding point, wherein the flow of water is at least partially recycled water from a fish holding unit of the recirculated aquaculture system.

This method has shown to improve feed transportation, since the feed is transported more gently than by pneumatic or mechanical transport methods and the amount of generated dust and fines is thereby reduced. Recirculated aquaculture systems provide a method of breeding fish, e.g. sea fish, away from the sea, in locations with limited access to seawater, and freshwater. By recirculating water already comprised in the system, this flow of water may be used to hydraulically transport feed to a feeding point. The water may be recirculated in a recirculation conduit as previous described and the flow of water may originate from the same fish holding unit or other fish holding units.

In a preferred embodiment the method further comprises a step of cleaning the flow of water to provide a flow of cleaned water. The cleaning is preferably performed before adding the feed to the flow of water.

This method may be used in existing facilities. Typically, the facilities comprise a recirculation conduit, in which water from the fish holding unit is treated and circulated back into the fish holding unit. A portion of the recirculation conduit, preferably a portion located downstream of the water treatment unit, may then be adapted for adding feed into the flow of water.

Existing RAS facilities may therefore be adapted for this method with minimal cost since existing conduits may be utilized.

The recirculation conduit may comprise a water inlet for supplying freshly supplied water to the water flow. Therefore, in an alternative embodiment the flow of water is at least partially recycled water from a fish holding unit of the aquaculture system. In open RAS facilities, water may be lost due to evaporation and it is preferred to replenish water in the fish holding unit. In a specific embodiment, the amount of recycled water is in the range of 90% to 99.9%, e.g. fresh water is added in the range of 0.1% to 10% of the water. The recycled amount of water is based on the total amount of water in the RAS. In other embodiments, the amount of recycled water is in the range of 95% to 99.9%, e.g. 98% to 99.9%, or 99% to 99.9%, or 99.3% to 99.7%.

The flow of water may comprise water from the fish holding unit, treated water from the fish holding unit, water from other or several fish holding units, treated water from other or several fish holding units, freshly supplied water, or any mixture thereof.

The circulated flow of water may be obtained by using pumps. The use of pumps and how to place them to obtain a suitable flow is known by the skilled person. For example, a pump may provide a positive or negative relative pressure at an appropriate location in the aquaculture system. One or more pumps may e.g. be located anywhere in the recirculation conduit to obtain a recirculation of water. The pump may be located upstream of the feed loading section to avoid causing any damage to the feed. Alternatively, a gentle pump which allows pellets to pass by without major damage, such as a fish pump, may be located downstream of the feed loading section. To minimize impregnation of pellets, it is preferred that the pump(s) are located upstream of the feed loading section.

In a preferred embodiment the feed containing water is supplied to a fish holding unit containing water, so that the fish holding unit has a water surface and the feeding point is at the water surface, or above, or below the water surface. This ensures that the release of feed is adapted for where the type of fish in the fish holding unit eat the feed. The location of the feeding point can thereby also be adapted to the type of feed, e.g. floating fish pellets may be feed near or above the surface, whereas sinking fish pellets may be fed below the water surface or even near the bottom of the fish holding unit. If the fish eat near the water surface, the feed may be provided above the surface or just below the water surface.

If the fish eat near the bottom, the feed may be provided near the bottom of the fish holding unit.

In a preferred embodiment two or more feeding points are located at different locations relative to the water surface. This is beneficial if an even feeding of the fish is desired. The depth is measured from the water surface towards the bottom of the fish holding unit in a vertical direction, i.e. parallel with the direction of gravity.

In another preferred embodiment the method additionally comprises a step of oxygenating the water to provide a flow of oxygen rich water.

The oxygenating may be in combination with the water treating unit or it may be a separate unit e.g. located upstream of the feed loading section.

BRIEF DESCRIPTION OF DRAWINGS

In the following description embodiments of the invention will be described with reference to the schematic drawings, in which:

FIG. 8 shows five schematic illustrations (8a-8e) of aquaculture systems according to different embodiments of the invention.

FIG. 9 shows four schematic illustrations (9a-9d) of aquaculture systems according to different embodiments of the invention.

DETAILED DESCRIPTION

Figure 1:
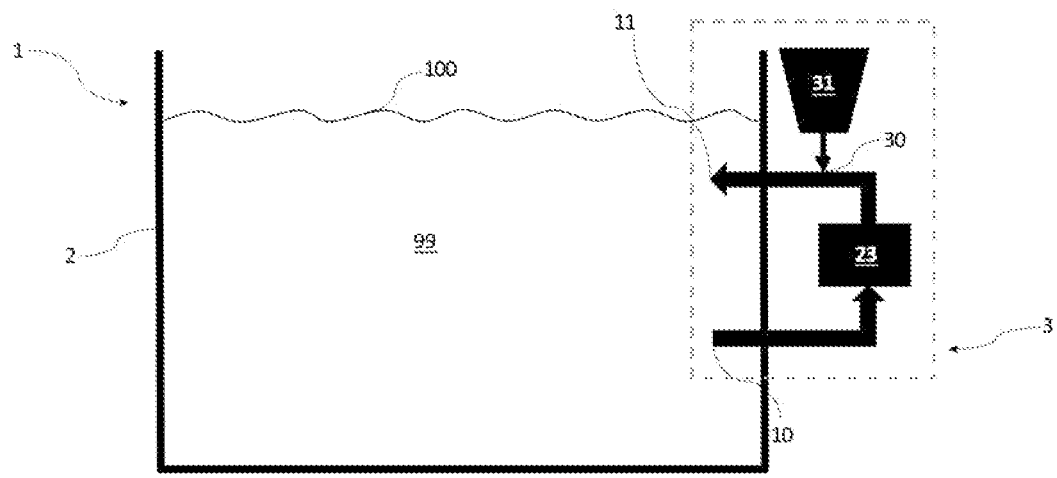
FIG. 1 shows a schematic illustration of an aquaculture system comprising a water recirculation conduit according to one embodiment of the invention.

Referring initially to FIG. 1, a schematic illustration of an aquaculture system 1 of an embodiment of the present invention is shown. The aquaculture system comprises a fish holding unit 2 in the form of a tank with an upper opening. When the water holding unit 2 is used for intended use, i.e. for breeding fish, it comprises water 99 and fish (not shown). A water recirculation conduit 3 is fluidly connected to the fish holding unit 2. The elements comprised in the water recirculation conduit 3 is shown inside the dotted rectangle. When water is recirculated, it flows from the fish holding unit 2 into the recirculation conduit 3 at the start site 10 to a water treatment unit 23. The arrows illustrate conduits in the aquaculture system 1 and the intended direction of the water flow. From the water treatment unit 23 the water returns to the fish holding unit 2 through the end site 11. In this particular embodiment, the start site 10 is located in the water below the water surface 100.

A feed loading section 30 is located downstream of the water treatment unit 23 such that feed is added to the treated water before it returns to the fish holding unit 2 at the end site 11. A feed storage unit 31 in the form of a silo is located adjacent the feed loading section 30. The feed storage unit 31 supplies feed to the feed loading section 30. The feed loading section 30 comprises feed loading means such as a venture injector, for leading feed into the conduit. Details not shown or described are readily apparent to the person skilled in the art. Elements having the same or analogous function have the same reference numerals.

Figure 2:
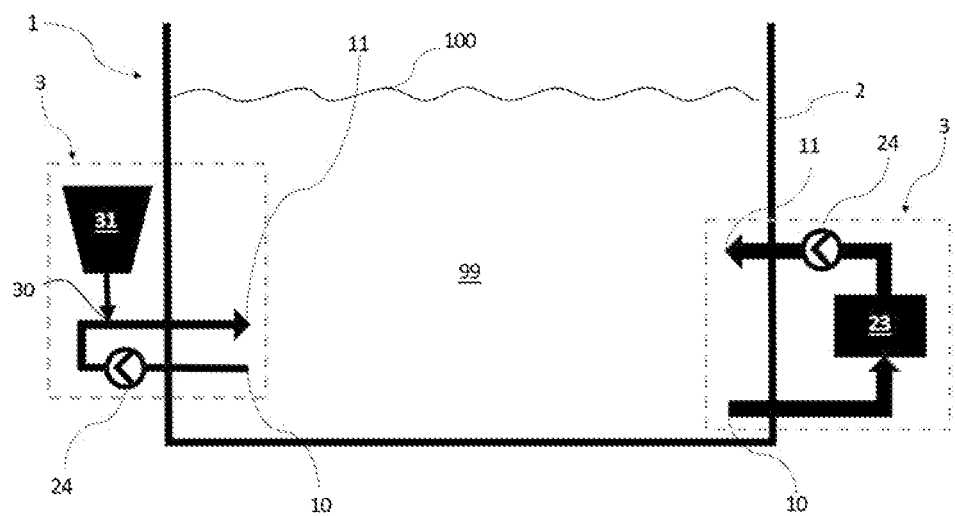
FIG. 2 shows a schematic illustration of an aquaculture system comprising two water recirculation conduits according to another embodiment of the invention.

Referring now to FIG. 2 in which an aquaculture system 1 according to another embodiment of the invention is shown. The aquaculture system 1 comprises a fish holding unit 2 with two water recirculation conduits 3. In the first water recirculation conduit 3, water flows from the fish holding unit 2 from the start site 10 to a feed loading section 30 where feed is added to the flow of water. The water including the feed, is then returned to the fish holding unit 2 at the end site 11. A feed storage unit 31 in the form of a silo, is located adjacent the feed loading section 30 from which feed is added to the flow of water. An adjustable opening (not shown) in the silo can be used to adjust the amount of feed which is loaded into the water. Alternatively, the amount of feed may be adjusted by the time that the opening is open. Alternatively, the feed may be measured volumetrically or gravimetrically before loading it into the water. The feed loading section 30 may comprise an opening in the conduit which allows feed to enter the water, or a conduit may be coupled to the feed loading section from the feed storage unit 31.

In the second water recirculation unit 3, water flows from the fish holding unit 2 to a water treatment unit 23 via a start site 10. The treated water is then returned to the fish holding unit 2 via the end site 11. The shown aquaculture system 1 may be particularly beneficial, when the water treatment unit 23 and the feed storage unit 31 are located remotely from each other. For example, multiple fish holding units 2 are often used to breed fish in an aquaculture system 1. Each fish holding unit 2 may have an independent water treatment unit 23 fluidly connected thereto, whereas the feed may be stored centrally in the facility. In this case it may be more beneficial to have two recirculation conduits as shown. A water pump 24 is located in both the recirculation conduits 3. In the recirculation conduit 3 which comprises the feed loading section 30, the water pump 24 is located upstream of the feed loading section 30. In this design the feed does not have to pass through the water pump 24 and is therefore not damaged by the water pump 24. If a gentle pump, such as a fish pump, is used as a water pump 24, it could be located downstream of the feed loading section 30, since the feed may be able to pass through the fish pump without being damaged. In the recirculation conduit 3 which comprises the water treatment unit 23, the water pump 24 is located downstream of the water treatment unit 23. Alternatively, the water pump 24 could also be integrated into the water treatment unit 23 or be located upstream of the water treatment unit 23.

Figure 3:
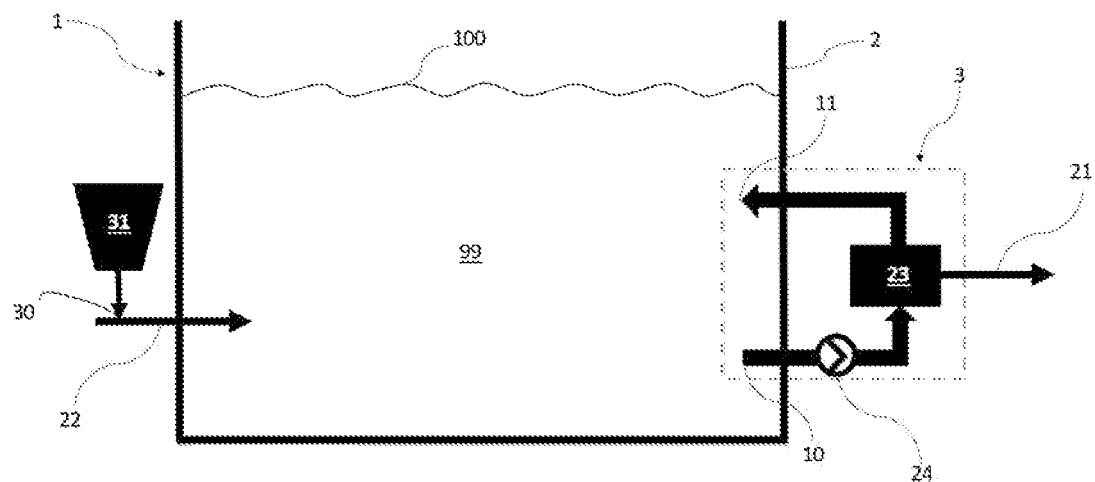
FIG. 3 shows a schematic illustration of an aquaculture system comprising a water recirculation conduit according to yet another embodiment of the invention.

Referring now to FIG. 3 in which an aquaculture system 1 according to another embodiment of the invention is shown. A water inlet 22 supplies water into the system 1. This water may be freshly supplied water which is added to the aquaculture system 1. Alternatively, the water could also be from another aquaculture system 1.

A feed loading section 30 is located upstream of the water inlet 22. Thereby the supply of e.g. freshly supplied water to the system 1 can hydraulically transport feed from the feed loading section 30 to the fish holding unit 2.

A water recirculation conduit 3 is located adjacent the fish holding unit 2. Water flows from the fish holding unit 2 to a water treatment unit 23 via the start site 10. Water from the water treatment unit 23 may flow back into the fish holding unit 2 via the end site 11. The water recirculation conduit is further coupled to water outlet 21 for removing water from the aquaculture system 1. A constant flow of water may be removed through the water outlet 21, or the outlet may comprise a valve (not shown), such that the outlet of water can be opened or closed. In this particular embodiment the outlet 21 is located in the water treatment unit 23. This location of the outlet 21 allows treated, or partly treated water to be removed. However, the location of the outlet 21 may be anywhere in the recirculation conduit 3, or even adjacent the fish holding unit 2. The location of the outlet is mainly determined by the desired water quality which should be removed from the aquaculture system 1. Hence the outlet 21 may be located upstream or downstream of e.g. a bio-filtration unit, mechanical filter unit, oxygenation unit, pH control unit, temperature control unit, Ultra Violet (UV) treatment unit, $CO_2$ stripping unit and/or ozone treatment unit. Alternatively, the system outlet may be located upstream or downstream of the water treatment unit 23. A water pump 24 is located in the recirculation conduit upstream of the water treatment unit, but it could be located anywhere in the recirculation conduit 3 downstream of the start site 10.

Figure 4:
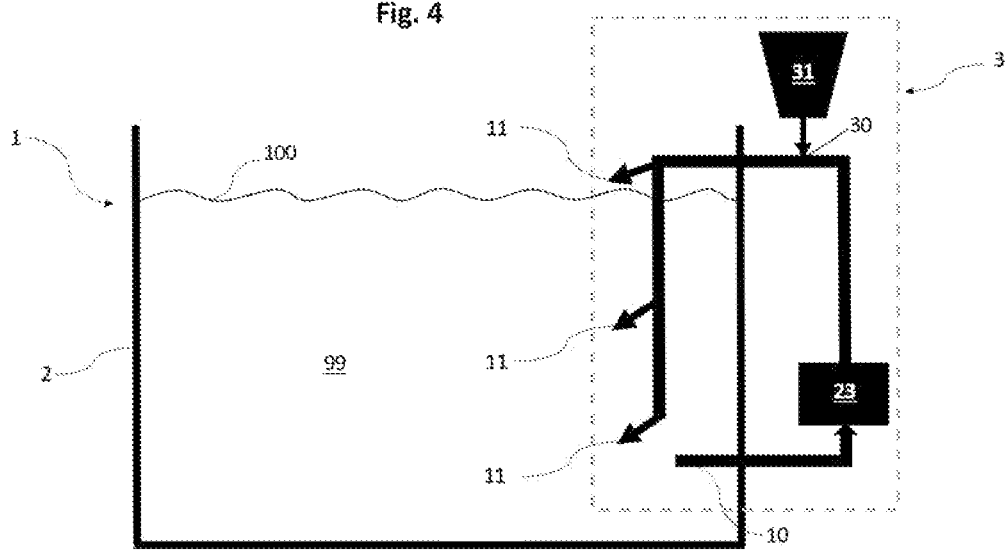
FIG. 4 shows a schematic illustration of an aquaculture system comprising a water recirculation conduit according to yet another embodiment of the invention.
Figure 5A:
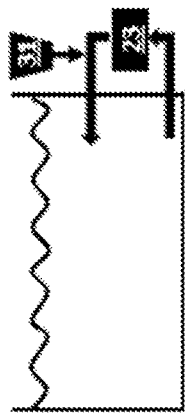
FIG. 5 shows six schematic illustrations (5a-5f) of aquaculture systems according to different embodiments of the invention.
Figure 5B:
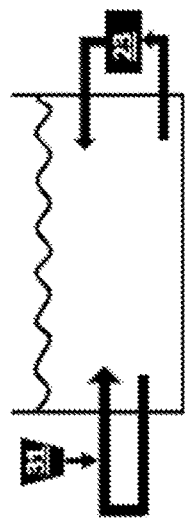
Figure 5C:
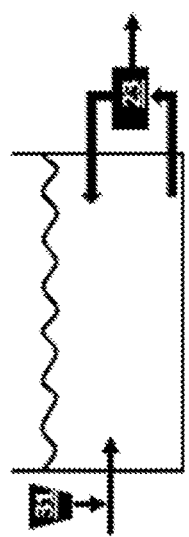
Figure 5D:
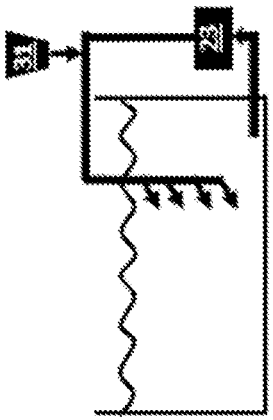
Figure 5E:
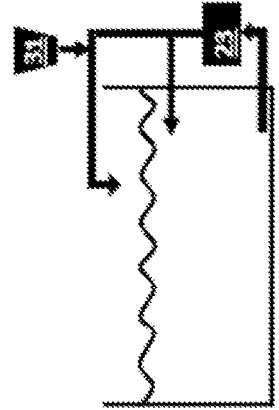
Figure 5F:
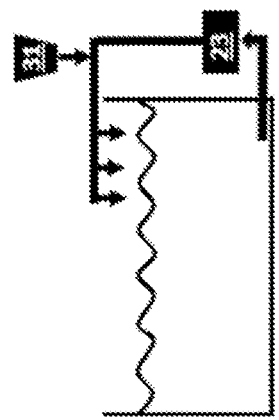
Figure 6A:
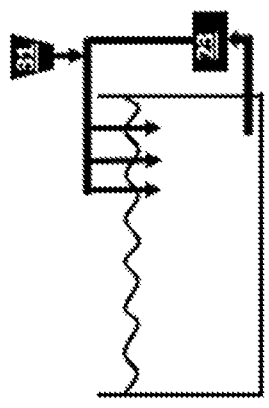
FIG. 6 shows six schematic illustrations (6a-6f) of aquaculture systems according to different embodiments of the invention.
Figure 6B:
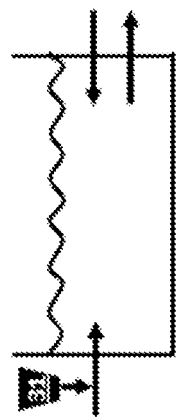
Figure 6C:
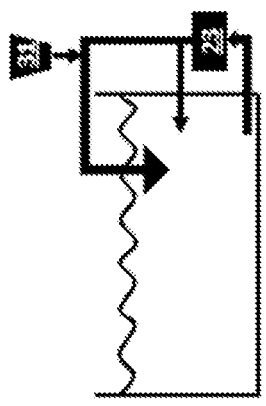
Figure 6D:
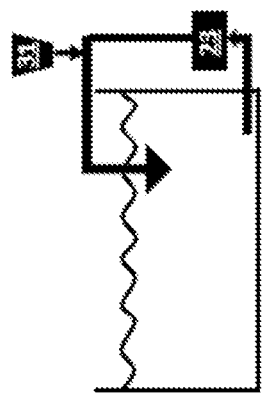
Figure 6E:
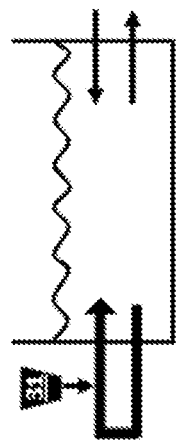
Figure 6F:
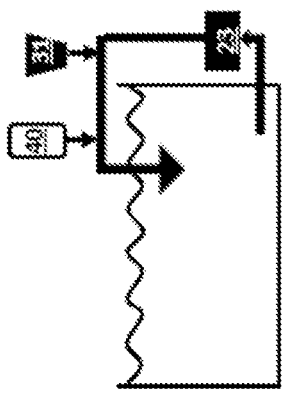
Figure 7C:
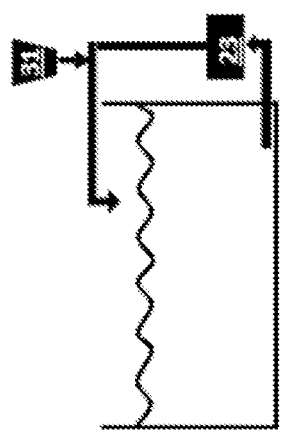
FIG. 7 shows six schematic illustrations (7a-7f) of aquaculture systems according to different embodiments of the invention.
Figure 7F:
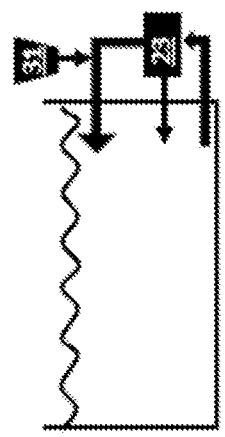
Figure 7B:
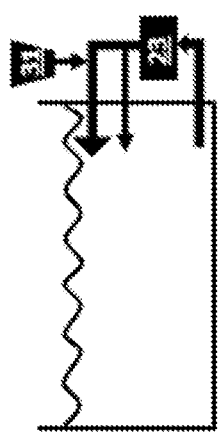
Figure 7E:
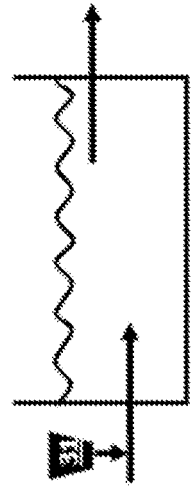
Figure 7A:
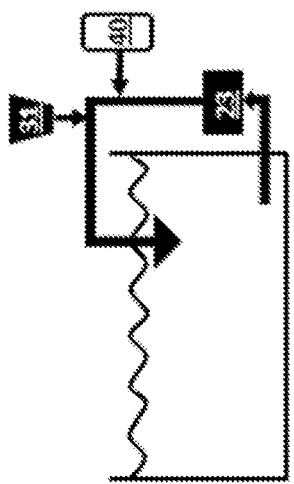
Figure 7D:
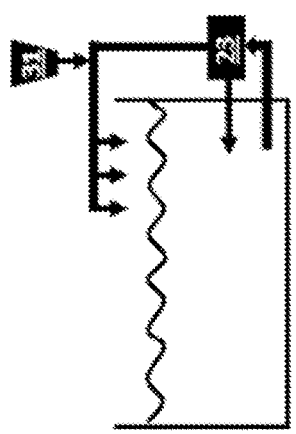

Referring now to FIG. 4 in which an aquaculture system 1 according to another embodiment of the invention is shown. The aquaculture system 1 has a fish holding unit 2 with a water recirculation conduit 3. When the system 1 is used for intended use, i.e. for breeding fish, the system comprises a desired volume of water located from the water surface 100 to the bottom of the fish holding unit 2. The water may flow from the fish holding unit 2 to a water treatment unit 23 in the water recirculation conduit 3, via a start site 10. The water is treated in the water treatment unit 23 to provide treated water of a desired purity and quality. The treated water is then returned to the fish holding unit 2 via a plurality of end sites 11. Feed is added to the treated water at the feed loading section 30. The plurality of end sites 11 distribute water and feed from the feed loading section 30 to different locations in the fish holding unit 2. In this particular embodiment, one end site 11 is located above the water surface 100 and two end sites 11 are located in the water of the fish holding unit 2 at different depths. This design is beneficial if the fish holding unit 2 comprise many fish that should be feed simultaneously. Different species of fish may also prefer to find/eat feed at different depths. The embodiment shown allows for hydraulic transportation of feed using recirculated water to several depths/locations in the fish holding unit 2.

In FIG. 5 six different embodiments (FIG. 5a-FIG. 5f) of the present invention are shown to illustrate different configurations of recirculation conduits 3. The recirculation conduits 3 may comprise several end sites 11 at different locations above or below the water surface 100 and/or openings at different depths below the water surface 100 or different locations above the water surface 100. In FIG. 5e the flow of water is divided into two streams after the water treatment unit 23. The first stream is directly returned to the fish holding unit 2 whereas the second stream is returned to the fish holding unit 2 after feed has been added to the flow of water at the feed loading section 30. It may be desired not to have a continuously feeding of fish in the fish holding unit 2. In that case the second stream may comprise a valve located upstream of the feed loading section. This valve could be regulated to an open or closed position and thereby open or close the second water stream of water. Opening and closing sections of the conduits by valves is especially important when the system is Cleaned In Place (CIP) and assures that cleaning liquids such as chemicals or hot water do not enter the fish holding unit 2.

FIG. 6 refers to six embodiments (FIG. 6a-FIG. 6f) of the present invention. FIG. 6d refers to a preferred embodiment where an oxygenation unit 40 is connected to the recirculation conduit 3 near the end site 11. The oxygenation unit 40 may be located either downstream or upstream from the feed loading section 30. By this, oxygenated water flowing into the fish holding unit 2 can increase the overall proportion of oxygenated water in the fish holding unit 2. Alternatively, the oxygenation unit 40 may be comprised in the water treatment unit 23. Alternatively, the oxygenation unit 40 may be located in a recirculation conduit without a feed loading section, or upstream of a water inlet 22.

FIG. 7 refers to another six embodiments (FIG. 7a-FIG. 7f) of the present invention. In a preferred embodiment shown in FIG. 7e, no water recirculation conduit 3 is present in fish holding unit 2. Feed is added to the water inlet 22 on a feed loading section 30. The inlet may supply freshly supplied water or water from another aquaculture system 1. Separated from the inlet 22 and the feed loading section 30, water leaves the fish holding unit 2 via an outlet 21.

FIG. 8 refers to another five embodiments (FIG. 8a-FIG. 8e). In a preferred embodiment shown in FIG. 8b, water flows from the fish holding unit 2 to the water treatment unit 23, and from the water treatment unit 23 to the fish holding unit 2 via the same water conduit. In this case the start site 10 and end site 11 for recirculation the water to/from the fish holding unit 2 is at the same place. In this embodiment the flow is altered in the two different directions. When the flow is directed from the water treatment unit 23 to the fish holding unit 2, feed can be added to the water via a feed storage unit and a feed loading section 30. When the flow is directed from the fish holding tank 2 to the water treatment unit 23 no feed is added. This may be controlled by valves which can be opened and closed and pumps which can alter the direction of the flow.

In another preferred embodiment depicted in FIG. 8c, two fish holding units 2 are fluidly connected by a water conduit, enabling water flow from a first fish holding unit 2 to a second fish holding unit 2. Additionally, another water conduit enables water to flow from the second fish holding unit 2 to a water treatment unit 23. Water flowing from the water treatment unit 23 into the first fish holding unit 2 can be supplied with feed from the feed storage unit 31 at the feed loading section 30. Alternatively, each of the two water conduits may have a feed loading section 30 and feed storage unit 31. In this embodiment the recirculation conduit 3 is comprised of several water conduits which enable the water flow to recirculate from the first fish holding unit 2 to the second fish holding unit 2 and return to the first fish holding unit 2.

In another preferred embodiment shown in FIG. 8e, a combined water inlet 22 and water outlet 21 is located adjacent the water treatment unit 23. From the water treatment unit 23, treated water flows back into the fish holding unit 2 via an end site 11. A feed storage unit 31 is fluidly connected to recirculation conduit 3 at the feed loading section 30 and allows supplementation of feed to the treated water. Additionally, separate conduits for water inlet 22 and water outlet 21 may be connected to the water treatment unit 23. Alternatively, the combined water inlet 22 and water outlet 21 may be located at any other position of the fish holding unit 2.

FIG. 9 refers to another four embodiments (FIG. 9a-FIG. 9d). In a preferred embodiment shown in FIG. 9a, two fish holding units 2 are connected to the same water treatment unit 23. In such an embodiment, water can be exchanged between a first fish holding unit 2 and a second fish holding unit 2 by flowing through a water treatment unit 23.

Feed is loaded into the water streams that leaves the water treatment unit 23 at two feed loading sections 30 fluidly connected to a single feed storage unit 31.

In another preferred embodiment of the present invention shown in FIG. 9b, three fish holding units 2 are comprised in the same aquaculture system 1. Additional fish holding units 2 may be comprised in the same aquaculture system 1 depending on the amount of fish to be bred. Each individual fish holding unit 2 has an individual water recirculation conduit 3 with a feed storage unit 31 and a feed loading section 30 enabling feed supplementation to each of the fish holding units 2. Additionally, each of the three fish holding units 2 are comprised in a common water recirculation conduit 3, in which a water treatment unit 23 is located. Treated water leaves the water treatment unit 23 and flows back into the three fish holding units 2 via branched water conduits. The embodiment of FIG. 9b allows to feed the fish in the three fish holding units 2 with different feeds and/or at different feeding rates whilst treating the water of the fish holding units 2 with a single water treatment unit 23.

In a further preferred embodiment shown in FIG. 9c, two fish holding units 2 are connected by a combined recirculation conduit 3. A pair of start sites 10 and end sites 11 is located in each of the two fish holding units 2.

Water flows from each of the fish holding units 2 to a single water treatment unit 23 where the two water flows may be mixed. Treated water then flows from the water treatment unit 23 to a single feed loading section 30 where feed is added from a feed storage unit 31. From the feed loading section 30, the water conduit is divided into two conduits for flowing the water and feed back to each of the two fish holding units 2 via the end sites 11. The water inlet branches into said two water inlets downstream of the feed loading section 30 and enables feed supply to both aquaculture systems 1.

The invention is not limited to the embodiments shown and described in the above, but various modifications and combinations may be carried out.

LIST OF REFERENCE NUMERALS 1 aquaculture system
2 fish holding unit
3 water recirculation conduit
10 start site
11 end site
21 outlet
22 inlet
23 water treatment unit
24 pump
30 feed loading section
31 feed storage unit
40 oxygenated water unit
99 water
100 water surface

EXAMPLES

Example 1

Hydraulic Transport of Feed in a RAS

Feed (pellets) stored in a feed storage unit were either added via a lobe pump or an ejector to a conduit on a RAS. The amount of water to pellets was varied (shown below as the water-to-pellet weight based ratio) as well as the water flow. The liquid loss, loss caused by generation of fines and the retention time were measured. The results are shown below in table 1:

TABLE 1

|  | Lobe | | | | Ejector | |
| --- | --- | --- | --- | --- | --- | --- |
| Trial | 1 | 2 | 3 | 4 | 5 | 6 |
| Loss, liquid [%] | 8.9 | 5.0 | 4.1 | 4.1 | 1.3 | 1.9 |
| Fines [%] | 0.95 | 0.80 | 0.80 | 0.40 | 0.040 | 0.060 |
| Total loss [%] | 9.9 | 5.8 | 4.9 | 4.5 | 1.3 | 2.0 |
| Speed [m/s] | 1.3 | 1.4 | 0.70 | 0.70 | 1.1 | 2.6 |
| Retention time [s] | 35 | 33 | 65 | 65 | 40 | 17 |
| Volume flow [m³/h] | 9.2 | 10 | 5.0 | 5.0 | 46 | 15 |
| Water-to-pellet ratio | 17 | 10 | 20 | 50 | 46 | 15 |

Where:
"Lobe" denotes the use of a lobe pump (which sucks up the pellets from a feed storage unit, where the pellets are stored in water).
"Ejector" denotes the use of an ejector for the addition of pellets to the conduit (which sucks the pellets down into the water flow in the conduit). The ejector is arranged after the pump of the conduit, whereby the pellets avoid having to go through the pump of the conduit.
"Loss, liquid" denotes the weight loss from e.g. oil which leaves the pellets in the water flow of the conduit.
"Fines" denotes the pellets weight loss from e.g. crumbles, dust and torn off parts of the pellets, which are lost in the water flow of the conduit.
"Speed" denotes the flow velocity of the water flow with the pellets.
"Retention time" denotes the time that the pellets are retained in the water flow of the conduit.

CONCLUSION

Hydraulic transport of pellets generally affords a very low generation of fines and a low liquid loss, even at different water-to-pellet ratios.

What is claimed is:
1. An aquaculture system comprising:
a first fish holding unit fluidly connected to a first water recirculation conduit which extends from a first water inlet to a first feeding point, the first water recirculation conduit having a water treatment unit therein, and a first feed storage unit in communication with the first water recirculation conduit at a first feed loading section,
wherein the first feed loading section is located in the first water recirculation conduit, so that when feed is added into the first water recirculation conduit at the first feed loading section the feed is hydraulically transported as a solid-liquid flow to the first fish holding unit,
wherein the first feed loading section is located downstream of the water treatment unit, and wherein the first water recirculation conduit is configured to operate at a total pressure drop of up to 7 bar.

2. The aquaculture system according to claim 1, wherein the water treatment unit comprises one or more of a bio-filtration unit, a solids removal unit, a pH control unit, a temperature control unit, an Ultra Violet (UV) treatment unit, an oxygenation unit, a $CO_2$ stripping unit, and an ozone treatment unit.

3. The aquaculture system according to claim 1, wherein the first recirculation conduit is coupled to at least one additional fish holding unit, wherein the at least one additional fish holding unit is optionally coupled in series or in parallel to the first fish holding unit.

4. The aquaculture system according to claim 1, wherein a portion of the first water recirculation conduit that is located downstream of the first feed loading section is made of a plastic material.

5. The aquaculture system according to claim 1, wherein the feed is hydraulically transported as a solid-liquid flow consisting of fish feed pellets and water.

6. The aquaculture system according to claim 1, wherein the first water recirculation conduit is configured to operate at a total pressure drop of up to 5 bar.

7. The aquaculture system according to claim 1, wherein the first water recirculation conduit is configured to operate at a total pressure drop of up to 3 bar.

8. The aquaculture system according to claim 1, wherein a residence time from the first feed loading section to the first feeding point is at or less than 3 min.

9. The aquaculture system according to claim 1, wherein a residence time from the first feed loading section to the first feeding point is at or less than 1 min.

10. The aquaculture system according to claim 1, wherein the first water recirculation conduit is configured to provide a Reynolds number between the first feed loading section and the first feeding point is below 500,000.

11. The aquaculture system according to claim 1, wherein the first water recirculation conduit is configured to provide a Reynolds number between the first feed loading section and the first feeding point in the range of 5,000 to 20,000.

12. The aquaculture system according to claim 1, wherein the first water recirculation conduit is configured to recirculate the water 0.5 to 20 times per hour.

13. The aquaculture system according to claim 1, wherein the first fish holding unit has a water surface and the first feeding point is at the water surface or above the water surface or below the water surface.

14. An aquaculture system comprising:
a first fish holding unit fluidly connected to a first water recirculation conduit which extends from a start site to an end site, the first water recirculation conduit having a water treatment unit therein;
a second water recirculation conduit fluidly connected to the first fish holding unit and which extends from a second water inlet to a second feeding point, and a feed storage unit in communication with the second water recirculation conduit at a second feed loading section, wherein the second feed loading section is located in the second water recirculation conduit, so that when feed is added into the second water recirculation conduit at the second feed loading section the feed is hydraulically transported as a solid-liquid flow to the first fish holding unit,
wherein the second water recirculation conduit is configured to operate at a total pressure drop of up to 7 bar.

15. The aquaculture system according to claim 14, wherein the feed is hydraulically transported as a solid-liquid flow consisting of fish feed pellets and water.

16. The aquaculture system according to claim 14, wherein the second water recirculation conduit is configured to operate at a total pressure drop of up to 5 bar.

17. The aquaculture system according to claim 14, wherein the second water recirculation conduit is configured to operate at a total pressure drop of up to 3 bar.

18. A method of transporting a feed in a recirculated aquaculture system, the method comprising the steps of:
providing a flow of water from a feed loading section to a feeding point of the recirculated aquaculture system,
adding the feed to the flow of water at the feed loading section to provide a solid-liquid flow of feed containing water,
hydraulically transporting the feed containing water as a solid-liquid flow to the feeding point,
cleaning the flow of water to provide a flow of cleaned water before adding the feed to the flow of cleaned water,
wherein the flow of water is at least partially recycled water from a fish holding unit of the recirculated aquaculture system; and
wherein the pressure drop in the recirculated aquaculture system from the feed loading section to the feeding point is up to 7 bar.

19. The method of transporting a feed according to claim 18, wherein the amount of recycled water is in the range of 90% to 99.9% based on the total amount of water in the recirculated aquaculture system.

20. The method of transporting a feed according to claim 18, wherein the step of cleaning the flow of water comprises one or more of bio-filtration, removal of solids, pH control, temperature control, Ultra Violet (UV) treatment, $CO_2$ stripping, and ozone treatment.

21. The method of transporting a feed according to claim 18, wherein the residence time from the feed loading section to the feeding point is at or less than 3 min.

22. The method of transporting a feed according to claim 18, wherein the feed containing water is supplied to the fish holding unit, which has a water surface and wherein the feeding point is at the water surface or above or below the water surface.

23. The method of transporting a feed according to claim 18, wherein two or more feeding points are located at different locations relative to the water surface.

24. The method of transporting a feed according to claim 18, wherein the Reynolds number between the feed loading section and the feeding point is below 500,000.

25. The method of transporting a feed according to claim 18, wherein the Reynolds number between the feed loading section and the feeding point is in the range of 5,000 to 20,000.

26. The method of transporting a feed according to claim 18, wherein water in the recirculated aquaculture system is recirculated 0.5 to 20 times per hour.

27. The method of transporting a feed according to claim 18, wherein the feed has a water content in the range of 5% w/w to 10% w/w based on the mass of the feed.

* * * * *